No. 728,068. Patented May 12, 1903.

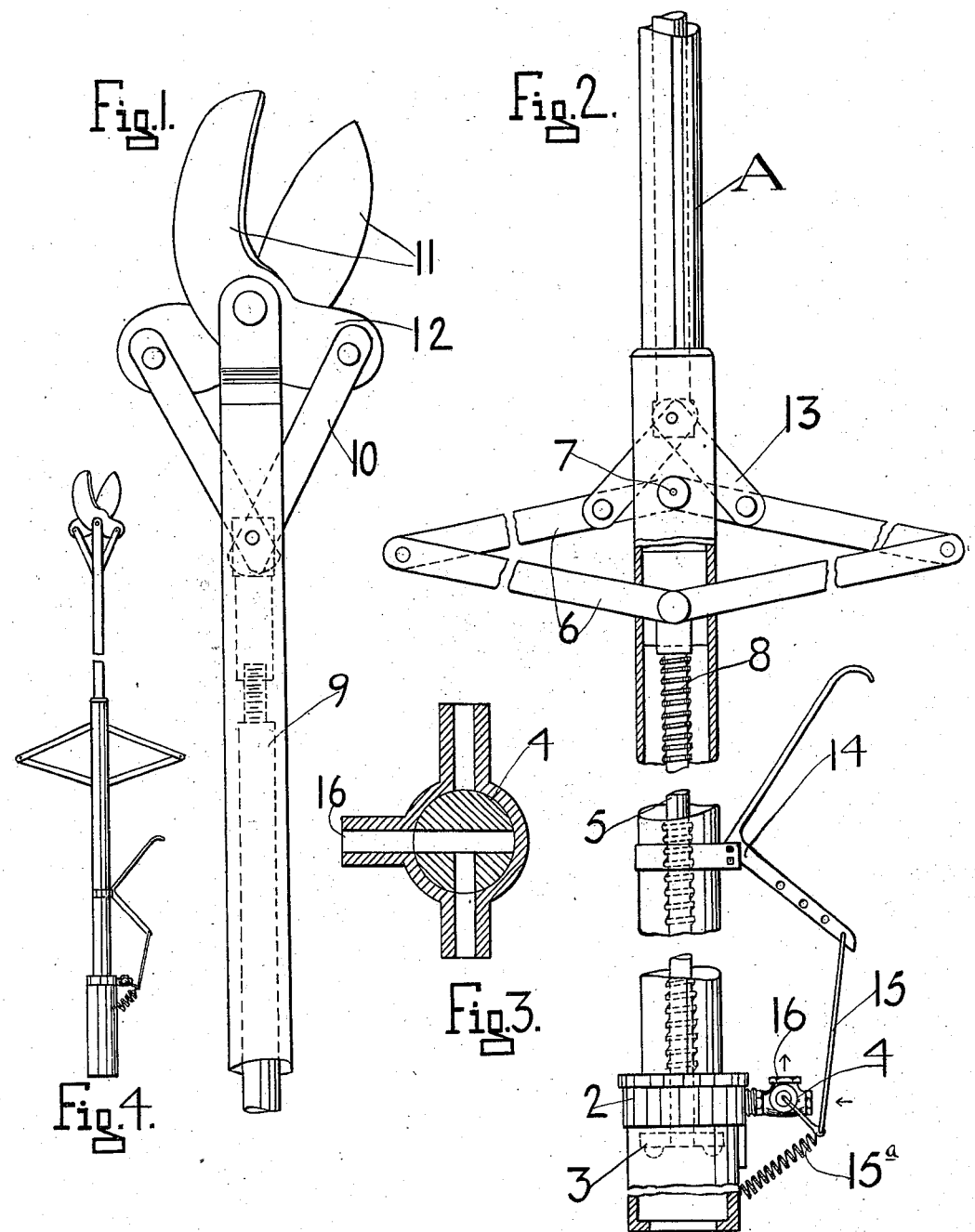

UNITED STATES PATENT OFFICE.

WESLEY YOUNG, OF SAN FRANCISCO, CALIFORNIA.

PNEUMATIC PRUNING-SHEARS.

SPECIFICATION forming part of Letters Patent No. 728,068, dated May 12, 1903.

Application filed February 16, 1903. Serial No. 143,578. (No model.)

*To all whom it may concern:*

Be it known that I, WESLEY YOUNG, a citizen of the United States, residing in the city and county of San Francisco, State of California, have invented an Improvement in Pneumatic Pruning-Shears; and I hereby declare the following to be a full, clear, and exact description of the same.

My invention relates to improvements in shears for trimming and pruning trees, hedges, and the like, and has reference particularly to pruning-shears, such as are actuated by compressed air or other suitable impelling fluid. Its object is to provide a labor-saving device which will also be more powerful and more efficient than the hand-actuated devices commonly in use.

It consists of the parts and the construction and combination of parts hereinafter more fully described, having reference to the accompanying drawings, in which—

Figure 1 is a view of the upper part of the apparatus, showing the shears and their connection with the piston-rod. Fig. 2 is a view of the lower part of the apparatus, showing means for operating the piston-rod. Fig. 3 is a detail in section of the admission and exhaust valve. Fig. 4 is an elevation of the machine.

A represents a tube or handle of light durable material and of suitable length to reach the highest branches it may be desired to trim. The lower end of the tube, which may be enlarged, if desired, carries a small cylinder 2, in which a single-acting piston, as indicated at 3, is movable through the agency of a suitable propelling medium admitted through the three-way cock 4. A piston-rod 5, secured to piston 3, extends through the head of the cylinder into the tube A and connects with the lower members of the toggle-levers 6, whose upper members have their contiguous ends pivoted in the tube A at 7. A spring 8 surrounds rod 5 and acts always to retract the piston 3 upward and to cause the toggles to be extended at right angles from the tube, as shown in Fig. 2. Extending through the tube above the toggles to connect with links 10 on the ends of the knife members 11 is a continuation 9 of the piston-rod. The knives are pivoted in the end of the tubular handle, and their crossed angular rear arm projections 12 are adapted, when drawn downward simultaneously, to bring the cutting edges of the knives together to sever the limb or twig. The lower end of rod 9 connects with the upper members of the toggles 6 by means of the links 13. The opposite sides of the handle are slotted properly to accommodate the various movements of the links 10 and of the levers 6 and their connecting parts.

Suitably situated with reference to the convenience of the operator is a bell-crank lever 14, fulcrumed on tube A and having one member connected by a rod 15 with an arm on the stem of the three-way valve 4.

The knives are operated by a simple movement of lever 14 to open cock 4 and allow fluid under pressure furnished from any suitable source of supply to enter the cylinder behind the piston, which is thereupon forced across the cylinder, acting through the piston-rod 5, the toggles 6, links 13, section 9, and links 10, to close the knives. On the release of lever 14 the cock is turned by means of a spring 15ª to close the inlet and open communication between the cylinder and the exhaust 16. Thereupon spring 8 retracts the piston and closes the toggles, which push up on section 9 to open the knives. This operation goes on repeatedly, and the rapidity with which the knives are actuated is limited only by the quickness with which the operator may oscillate the lever 14, and the power or force exerted by the knives is determined by the length of the toggle members 6 and arms 12. The outer end of cylinder 2 is open except for an inturned flange to act as a stop for a rubber buffer on the end of the piston.

It is intended that the whole apparatus will be made light enough to be easily carried about by the operator and held in his hands and manipulated above his head in the manner customary in pruning trees and shrubbery.

With an apparatus of this character it is not only possible to cut off bigger limbs than could be done by hand but to accomplish a great deal more in a given length of time and without the fatigue attendant upon handling an ordinary pair of hand-operated shears.

Having thus described my invention, what I claim, and desire to secure by Letters Patent, is—

1. The combination with a pair of shears, of a portable support therefor, fluid-pressure means upon said support for automatically closing the shears, and an independent power mechanism for opening the shears when the fluid-pressure is relieved.

2. The combination in a power-driven pruning-shears, of a handle portion, cutting-knives pivoted thereon, fluid-pressure means carried by the handle for closing said knives automatically, and a separate pressure device for opening the knives when the closing fluid-pressure is relieved.

3. The combination of a tubular handle, cutting devices carried thereby, a cylinder carried on said handle, a piston movable in said cylinder and having operative connections with said cutting devices for closing the latter, and a separate power device for opening the cutting devices.

4. The combination of a tubular support, cutting-knives pivoted thereon, a cylinder carried by said support, a piston movable in the cylinder and operative connections through the tube between the piston and knives to close the latter, and a spring actuating mechanism for again opening the knives.

5. The combination of a tubular handle, a cylinder in line and rigid therewith, a piston movable in the cylinder, a piston-rod incased in said handle and cutting-knives carried by the handle and closable by the movements of said piston, and a spring acting on said rod to open the knives when the closing pressure is relieved.

6. The combination of cutting devices, a support therefor, a cylinder, a piston movable in said cylinder, connections between said piston and cutting devices, and means including a three-way cock and lever mechanism to operate said cock whereby the admission of the impelling fluid to said chamber is controlled.

7. The combination in a pruning apparatus of a tubular handle, a cylinder carried by said handle, a piston movable in said cylinder, means for controlling the admission of fluid to said cylinder, cutting devices upon said handle and closable by fluid-pressure, piston-rod connections between said devices and piston, lever mechanism interposed in said piston-rod connections, and an expanding spring for opening the cutting devices when the fluid-pressure is relieved.

8. The combination in a pruning apparatus of a tubular support, cutting-knives pivoted thereon, a cylinder carried thereby, a piston movable in the cylinder, and a sectional piston-rod and toggle-lever connections interposed between the knives and piston.

9. The combination in a pruning apparatus, of a tubular handle or support, cutting-knives pivoted thereon, a cylinder carried thereby, a piston movable in the cylinder, a sectional piston-rod incased in said support, toggle-levers having one end pivoted in the support and the other end pivoted to an end of a section of the rod and movable in slots in the support, the adjacent end of the succeeding section having link connections with said toggles, and connections of the upper end of said section with the knives.

10. The combination in a pruning apparatus, of a handle or support, a cylinder rigid and in axial alinement therewith, a piston movable in the cylinder, cutting devices upon the support, operative connections between the piston and said devices, a normally closed three-way valve controlling admission to and exhaust from the cylinder, and hand-lever mechanism in connection with the handle for operating said valve.

In witness whereof I have hereunto set my hand.

WESLEY YOUNG.

Witnesses:
S. H. NOURSE,
JESSIE C. BRODIE.